United States Patent [19]

Myer

[11] Patent Number: 4,611,883
[45] Date of Patent: Sep. 16, 1986

[54] TWO-DIMENSIONAL OPTICS ELEMENT FOR CORRECTING ABERRATIONS

[75] Inventor: Jon H. Myer, Woodland Hills, Calif.

[73] Assignee: Hughes Aircraft Company, Los Angeles, Calif.

[21] Appl. No.: 551,731

[22] Filed: Nov. 10, 1983

Related U.S. Application Data

[63] Continuation-in-part of Ser. No. 261,315, May 1, 1981, abandoned.

[51] Int. Cl.$^4$ .............................................. G02B 6/12
[52] U.S. Cl. ................... 350/96.12; 350/96.18
[58] Field of Search ............... 350/96.11, 96.12, 96.15, 350/96.18, 433, 432, 442, 358

[56] References Cited

U.S. PATENT DOCUMENTS

| | | | |
|---|---|---|---|
| 2,551,852 | 5/1951 | Rinia | 350/443 |
| 3,917,384 | 11/1975 | Harper et al. | 350/96.18 |
| 4,345,815 | 8/1982 | Righini et al. | 350/96.18 |
| 4,403,825 | 9/1983 | Tangonan et al. | 350/96.11 |

OTHER PUBLICATIONS

Righini et al., Proceedings of Society of Photo-Optical Instrum. Engineers, Netherlands, Oct. 10-13, 1978, SPIE, vol. 164, pp. 20-26, "Signal Processing . . . ".
Vahey, Ultrasonics Symposium Proceedings, Cherry Hill, N.J., U.S.A., Sep. 25-27, 1978, pp. 70-73, "Corrected Waveguide Geodesic Lenses . . . ".
Hatakoshi et al., Optica Acta, Aug. 1979, vol. 26, No. 8, 961-968, "Optical Waveguide Lenses".
Naumaan et al., Appl. Phys. Lett., 35(3), Aug. 1, 1979, pp. 234-236, "A Geodesic Optical Waveguide Lens Fabricated by Anisotropic . . . ".
Kassai et al., Topical Meeting on Integrated and Guided-Wave Optics, Salt Lake City, Utah, U.S.A., Jan. 16-18, 1978, MA2-1-4, "Aberration Corrected . . . ".
Vahey et al., IEEE J. of Quantum Electronics, vol. QE-13, No. 4, Apr. 1977, pp. 129-134, "Focal Characteristics of Spheroidal Geodesic Lenses . . . ".
Myer et al., Applied Optics, vol. 20, No. 3, Feb. 1, 1981, pp. 412-416, "Diffraction Limited Geodesic Lens: A Search for Substitute Contours".
Chen et al., Appl. Phys. Lett., 33(6), Sep. 15, 1978, pp. 511-513, "Diffraction Limited Geodesic Lens for Integrated Optical Circuits".
Barnoski et al., 1978 Ultrasonics Symposium Proceedings, 1978, "Design, Fabrication and Integration of Components for an Integrated . . . ".
Giallorenzi, Topical Meeting on Integrated and Guided Wave Optics, Salt Lake City, Utah, U.S.A., Jan. 16-18, 1978, MA1-1-3, "An Overview of Microoptic Signal . . . ".

Primary Examiner—William L. Sikes
Assistant Examiner—Frank González
Attorney, Agent, or Firm—A. W. Karambelas; K. W. Float

[57] ABSTRACT

Auxiliary depressions, disposed in the substrate of an integrated optic device which employs geodesic lenses, to adjust the effective focal distance of the geodesic lenses and correct optical aberrations of the geodesic lens system are disclosed. The integrated optic device comprises a substrate, a planar waveguide disposed thereon, a laser source at one end and a detector array at the other end, and geodesic lenses disposed in the substrate. The auxiliary surface depressions are non-spherical, symmetrical about a longitudinal axis and disposed in the substrate between either end of the substrate and the geodesic lens closer to that end. By increasing the path length of light transmitted along the surface layer, these auxiliary depressions allow adjustment of the effective focal distance of the geodesic lenses. Also, non-symmetrical auxiliary surface depressions which correct for optical aberrations in the geodesic lens system are disclosed.

12 Claims, 4 Drawing Figures

TWO-DIMENSIONAL OPTICS ELEMENT FOR CORRECTING ABERRATIONS

CROSS-REFERENCE TO A RELATED APPLICATION

This is a continuation-in part application of Ser. No. 261,315, filed May 1, 1981, now abandoned.

BACKGROUND

The present invention relates generally to planar optical systems and more particularly to planar optical systems utilizing geodesic lens elements.

Recent developments in the integrated optics field have resulted in the design and development of integrated optic spectrum analyzers, and the like. A typical spectrum analyzer device is described in a publication by M. K. Barnoski et al entitled "Design, Fabrication and Integration of Components for an Integrated Optic Spectrum Analyzer", 1978 Ultrasonic Symposium Proceedings, IEEE, pages 74–78. The basic integrated optic spectrum analyzer comprises a laser source which transmits light along a planar waveguide layer deposited on the surface of a substrate. Geodesic lenses are disposed in the substrate and the waveguide layer conforms to the contour of the substrate. For example, a geodesic lens collimates laser light through a surface acoustic wave device which deflects the collimated laser beam in proportion to the strength or frequency of the signals applied to the surface acoustic wave device. After the laser light passes through the surface acoustic wave device, a second geodesic lens refocusses the light onto a photoelectric detector array.

Heretofore, in order to insure that the laser source and detector array were precisely located at the focal planes of the geodesic lenses, it was necessary to remove excess material from the ends of the substrate and waveguide layer prior to locating the laser source and detector elements. The shortcomings of this approach are that it cannot correct for lenses with focal lengths in excess of the platelet dimension; that is, where substrates and waveguide layers are shorter than the focal length of the geodesic lenses. Fabrication of the geodesic lens system, therefore, is only a one-way method. The platelet may be shortened to properly place the laser source or detector array at a focal plane of the geodesic lens located on the structure. Shortening of the platelet changes the over-all dimensions of the spectrum analyzer in an uncontrollable manner leading to assembly and installation problems.

Therefore, it would be an improvement in the integrated optics art to provide a means by which to adjust the positions of focal planes of lenses utilized in a geodesic lens system, or the like, without changing the dimensions of the structure.

It would also be an improvement in the integrated optics art to provide a means by which to correct for optical aberrations in a planar waveguide system which defocus light rays transmitted by the system.

SUMMARY OF THE INVENTION

In order to overcome the above mentioned shortcomings, the present invention provides for an optical element which is utilized in conjunction with an integrated optic device which employs geodesic lenses, such as an integrated optic spectrum analyzer. The integrated optic device has a substrate into which is disposed a geodesic lens, and onto which is disposed a planar surface layer, or waveguide, for transmitting light therethrough. The surface layer conforms to the contour of the substrate and light is transmitted in the plane of the waveguide from a source to a detector. The improvement comprises an optical element including an auxiliary surface depression disposed on the substrate having a predetermined depth and contour. The depression may be symmetrical about a predetermined longitudinal axis of the surface layer and is generally cylindrical in shape. This optical element increases the length of the path of light transmitted or intercepted by the geodesic lens so as to reposition the focal plane of the geodesic lens at a predetermined position closer to the lens. Alternatively, nonspherical depressions having complex geometric curvature may be provided which correct for optical aberrations in the integrated optic device by focusing divergent light.

In an integrated optic spectrum analyzer device, the present invention provides for an increase in path length of the light transmitted along the surface layer. This increased path length allows the focal plane of a lens to be adjusted so as to have the focal plane at either the input position of the laser source or the output position of the detector array without modifying the substrate dimensions. In addition, aspheric lens designs or lenses with complex curvatures may be incorporated as the optical element allowing the light to be focused in a manner which corrects for abnormalities in the planar optical system.

BRIEF DESCRIPTION OF THE DRAWINGS

The aforementioned features and advantages of the present invention may be more readily understood with reference to the following detailed description taken in conjunction with the accompanying drawing, wherein like reference numerals designate like structural elements, and in which.

DETAILED DESCRIPTION OF THE INVENTION

Figure 1:
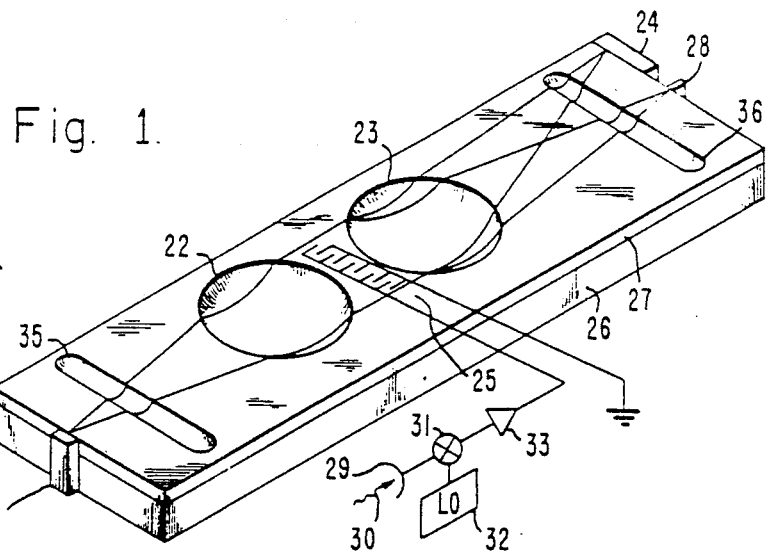
FIG. 1 is an embodiment of an integrated optic spectrum analyzer incorporating optical elements in accordance with the present invention.

Referring to FIG. 1, there is shown an integrated optical spectrum analyzer 20 which comprises a substrate 26 and a planar surface layer 27, or waveguide, disposed thereon. The substrate 26 comprises a nonlinear optical material for active devices but can be any transparent optical material for passive devices. A laser source 21, such as a solid state or injection laser, or the like, is disposed at one end of the substrate 26. A detector array 24 and a reference cell 28 are disposed at the opposite end of the substrate. The detector array 24 may be a CCD array or the like. Two geodesic lenses 22, 23 are disposed in the substrate 26. These lenses 22, 23 are fabricated by means of well-known methods, such as are described in publication by B. Chen et al, entitled, "Diffraction Limited Geodesic Lens for Integrated Optics Circuits", *Applied Physics Letters* 33(6), Sept. 15, 1978. The lenses 22, 23 are generally fabricated by means of an ultrasonic impact grinding or a computer controlled polishing device which polishes the surface of the substrate 26 to the desired depth and contour. The lenses 22, 23 are designed to collimate the in-plane light from the laser source 21 through the surface acoustic wave elements 25 and focus the collimated light onto the detector array 24.

FIG. 1 also illustrates the surface acoustic wave elements 25 which couple to an apparatus which down-converts received energy 30 in order to be compatible with the frequency bandwidth of the surface acoustic wave elements 25. The apparatus for down-conversion includes an antenna 29, or the like, coupled through a mixer 31 to an amplifier 33. A local oscillator 32 applies signals to the mixer 31 combining the received energy 30 and the signals provided by the local oscillator 32 in a conventional manner to provide output signals in a frequency range compatible with the surface acoustic wave elements 25. The surface acoustic wave elements 25 transmit acoustic signals across the surface layer 27, and interact with the in-plane laser light transmitted by the laser source 21. This interaction causes a diffraction of the laser beam which in turn causes a change in position of the light focused upon the detector array 24. The output of the detector array 24 provides an indication of the direction of arrival of the applied energy 30. The design and operation of this type of spectrum analyzer is described in the above-referenced publication by M. K. Barnoski et al.

Figure 4:
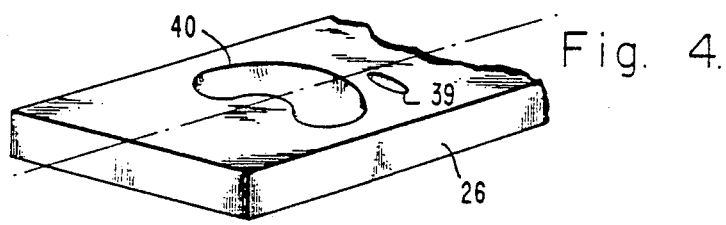
FIGS. 2, 3 and 4 show alternative aspheric lens optical element designs which may be utilized in the spectrum analyzer of FIG. 1.
Figure 2:
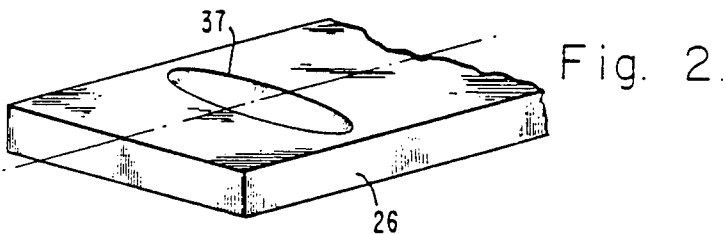
Figure 3:
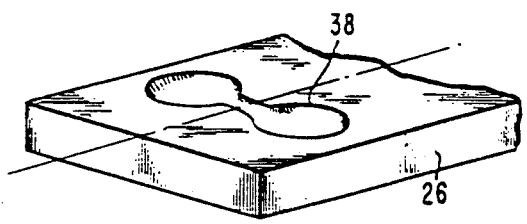

The improvements of the present invention are provided by optical elements 35, 36, which in FIG. 1 are shown as additional elongated depressions disposed in the substrate 26. These auxiliary depressions are generated in the same manner as the lenses 22, 23 which can be accomplished by ultrasonic impact grinding, computer controlled polishing or other techniques known in the art. The optical elements 35, 36 are disposed in the substrate 26 prior to deposition of the surface layer 27. The optical elements 35, 36 have a predetermined depth and contour which are a function of the focal length of the geodesic lenses 22, 23. The surface depressions are disposed in the substrate 26 so that they are summetrical about a predetermined longitudinal axis of the substrate 26 and the surface layer 27. This axis is most clearly illustrated as the center line shown in FIGS. 2, 3 and 4. This axis is generally chosen to be the direction of propagation of the laser light along the surface layer 27. The optical elements 35, 36 increase the path length of light transmitted therethrough, which modifies the position of the focal line of the lens elements 22, 23.

The optical elements 35, 36 shown in FIG. 1 are shaped in the form of a rounded groove, or the like. These grooved optical elements 35, 36 are utilized when the geodesic lens elements 22, 23 do not focus the light transmitted thereby at the end of the surface layer 27 as desired, but focus it beyond the end of the platelet. If necessary, however, alternative groove shapes may be disposed in the substrate 26 as is shown by aspheric optical elements 37, 38 and 40 shown in FIGS. 2, 3, and 4. The aspheric optical elements 37, 38 and 40 may be disposed in the substrate 26 in a manner similar to that of both the geodesic lenses 22, 23 and the optical elements 35, 36. In this manner the aspheric elements 37, 38 and 40, provide for correction of the light rays passing therethrough and compensate for aberrations in the lens structure and errors in focal length when the geodesic lenses 22, 23 cannot do so by themselves.

The position of the focal line of the geodesic lens system depends on the depth and contour of the optical elements 35, 36, 37, 38, 40. The depth and contour dimensions which would effect the desired location of the focal plane cannot always be precisely be predetermined, although they can be approximated and then finely adjusted. This approach involves alternately adjusting the depth and contour of optical elements 35, 36, 37, 38, 40 and testing the focal length of the geodesic lens, until the desired system focal length is obtained. If the focal length of the geodesic lens system is longer than desired, the depressions of the optical elements 35–38, 40 are deepened. If the focal length is too short, the length of the substrate and the overlying waveguide layer are shortened until the focal line coincides with the end of the planar waveguide. This type of approximation and then adjustment approach is often used in many areas of the optics art, as for example, in lens centering.

The following are some of the methods which can be followed to determine the focal length of the geodesic lens system before the waveguide layer is deposited or formed.

A transparent oil or lacquer with a higher refractive index than the substrate material can be deposited on the substrate so that light is transmitted along its plane. The focal length of the geodesic lens system can then be determined and if necessary adjusted.

Alternatively, a transparent replica of the substrate with the geodesic lenses and surface depressions is made with acrylic casting. The focal length of the transparent plastic replica can be determined by orthogonally trans-illuminating it. The focal length of this replica can also be determined by measuring the contour of the replica with a contourrecording device.

It is also possible to determine the focal length of the geodesic lens system by measuring the contour of the substrate directly using appropriate optical methods or a contour recording device.

Alternatively, the pseudo-focal length of the concave depressions in the substrate can be determined by trans-illumination of the substrate from below and using selected positive lenses of known focal length above the substrate until a measurable converging focus is obtained. The pseudo-focal lengths of the surface depressions can then be correlated with their focal lengths when operated as in plain geodesic lenses.

The optical element 39 may be provided to correct for optical aberrations in the geodesic lenses due to abnormalities in the substrate 26, or the like caused in the manufacture of the lens depression. Singular depressions may be employed to correct for problems caused in certain areas of the substrate 26. A further understanding of the design and fabrication of geodesic lenses may be obtained with reference to the publication by J. H. Myer et al, entitled "Diffraction-Limited Geodesic Lens: A Search for Substitute Contours", *Applied Optics*, Vol. 20, pg. 412, Feb. 1, 1981.

It is to be noted that the polishing process utilized in obtaining the geodesic lenses 22, 23 and optical elements 35–40 disclosed herein destroys shallow diffused waveguide layers, such as the surface layer 27. Therefore, it is necessary to polish the surface depressions prior to formation of the surface layer 27 on the substrate 26. After the polishing process has been completed, the waveguide 27 may be evaporated onto or chemically diffused into the surface to produce the waveguide layer structure.

Thus, there has been disclosed a plurality of optical elements for use in the integrated optics art which allow for positioning of the focal plane of a geodesic lens and correction of optical aberrations in a two-dimensional guided optical wave structure, such as is employed in an integrated optical spectrum analyzer.

It is to be understood that the above-described embodiments are merely illustrative of some of the many specific embodiments which represent applications of the principles of the present invention. Clearly, numerous and varied other arrangements may be readily devised by those skilled in the art without departing from the spirit and scope of the invention.

What is claimed is:

1. An optical element for adjusting the effective focal length of a planar geodesic lens system, said lens system comprising:

a substrate;

a diffused planar surface layer on said substrate, said surface layer conforming to the contour of said substrate and being transmissive of optical radiation and having a source end, for receiving input optical radiation and a detector end, for transmitting optical radiation traversing said surface layer;

at least one spherical depression in said substrate, with said surface layer following said at least one spherical depression in said substrate so as to form at least one geodesic lens in said surface layer, said at least one geodesic lens being shaped so that a substantial portion of the optical radiation passing through said planar surface layer from said source end toward said detector end is focussed by said geodesic lens toward said detector end;

characterized in that said optical element comprises at least one non-geodesic or non spherical auxiliary depression in said substrate positioned between said at least one geodesic lens and said source end or said detector end within the focal path of said geodesic lens, said surface layer following the contour of said at least one auxiliary depression providing an increased path length for optical radiation traversing said surface layer, said auxilary depression having a depth sufficient to increase the length of the optical path of said surface layer, and thereby the focal length of said at least one geodesic lens, so that the focal line of said at least one geodesic lens is contiguous with the edge of said substrate at said source or said detector end without modification of the external dimensions of said substrate.

2. The optical element of claim 1 wherein said auxiliary depression is cylindrical toroidal ellipsoidal, or ovoidal in geometry.

3. The optical element of claim 1 wherein said auxiliary depression comprises a depression that is an elongated cylindrical shape.

4. The optical element of claim 3 wherein said elongated cylindrical depression is positioned symmetrically about a line extending perpendicular from the focal plane of said at least one geodesic lens through the center of said geodesic lens.

5. An optical element for correcting optical aberrations in lenses in a geodesic lens system having geodesic lens disposed in a planar waveguide optical system, wherein optical radiation in the focal path of said geodesic lenses are defocused due to variations in said lens structure, said element comprising:

at least one surface depression disposed in said planar waveguide optical system in the focal path of at least one geodesic lens in said geodesic lens system said depression being non-geodesic or non-spherical in geometry and configured to focus optical radiation and correct for optical aberrations in said at least one lens in said geodesic lens system.

6. A method of adjusting the effective focal distance of a geodesic lens system disposed in a planar waveguide on a substrate having a source end and a detector end for optical radiation said planar waveguide being formed by a diffused planar surface layer disposed on said substrate for transmitting in-plane light therethrough, said surface layer conforming to the contour of said substrate, which comprises:

forming at least one auxiliary depression in said substrate to increase the path length for optical radiation transmitted from said source end through said geodesic lens to said detector end, said at least one auxilary depression being disposed between said geodesic lens and said source end or said detector end, said at least one auxilary depression being shaped in the form of a non-geodesic or non-spherical groove said auxilary depression having a depth sufficient to increase the length of the optical path of said surface layer, and thereby the focal length of said geodesic lens, so that the focal line of said geodesic lens is contiguous with the edge of said substrate at said source or said detector end.

7. The method of claim 6 further comprising the steps of:

forming the depression for said geodesic lens in said substrate;

testing the focal length of said geodesic lens;

forming said auxilary depression with a depth sufficient to generate an increased optical length in said surface layer so as to alter the focal length of said geodesic lens; and diffusing on said planar surface layer.

8. The method of claim 7 further comprising the steps of:

testing the focal path of said geodesic lens and auxilary depression combination prior to surface layer deposition; and adjusting or increasing the depth of said auxilary depression as required to achieve substantially more accurate focus of said lens and auxilary depression combination at the edge of said substrate.

9. The method of claim 6 wherein the step of forming said auxiliary depression comprises ultrasonic impact grinding removal of material from said substrate.

10. The method of claim 6 wherein said auxiliary depression is cylindrical toroidal, ellipsoidal, or ovoidal.

11. A method of correcting optical aberrations in geodesic lenses which cause defocussing in a geodesic lens system disposed in a planar optical waveguide on a substrate having a source end and a detector end, said planar waveguide being formed by a diffused surface layer disposed on said substrate for transmitting in-plane optical radiation therethrough, said surface layer conforming to the contour of said substrate, which comprises:

forming at least one auxiliary surface depression in said substrate having non-spherical geometry and disposed in the focal path of said geodesic lens system, said depression having that depth required to increase the optical path length of said surface layer disposed on said auxiliary depression in order to improve the focus of said geodesic lens system so as to compensate for aberrations, said depression positioned adjacent to the site of said aberrations in said lenses.

12. The method of claim 11 wherein said auxiliary depression is cylindrical toroidal, ellipsoidal, or ovoidal.

* * * * *